(12) United States Patent
Mackiewicz

(10) Patent No.: US 6,991,074 B1
(45) Date of Patent: Jan. 31, 2006

(54) DISC BRAKE

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/906,384

(22) Filed: Feb. 17, 2005

(51) Int. Cl.
*F15D 65/02* (2006.01)

(52) U.S. Cl. .................... 188/73.45; 188/73.39

(58) Field of Classification Search ............ 188/70 R,
188/70 B, 71.1, 71.3, 72.1, 72.2, 72.4, 73.1,
188/73.31, 73.39, 73.41, 73.42, 73.43, 73.44,
188/73.45, 73.46, 73.47
See application file for complete search history.

(56) References Cited

U.S. PATENT DOCUMENTS

| | | | | |
|---|---|---|---|---|
| 4,044,864 A | * | 8/1977 | Karasudani | 188/73.39 |
| 4,200,173 A | * | 4/1980 | Evans et al. | 188/73.45 |
| 4,219,106 A | | 8/1980 | Lipertz et al. | |
| 4,335,806 A | | 6/1982 | Lipertz | |
| 5,111,914 A | | 5/1992 | Thiel et al. | |
| 6,039,155 A | * | 3/2000 | Demoise, Jr. | 188/73.39 |
| 6,039,156 A | * | 3/2000 | Schneider | 188/73.44 |
| 6,131,706 A | * | 10/2000 | Gotti et al. | 188/72.4 |
| 6,345,701 B1 | * | 2/2002 | Di Ponio | 188/73.31 |
| 6,533,080 B2 | * | 3/2003 | Miyata | 188/73.37 |
| 6,725,981 B1 | * | 4/2004 | Franz | 188/73.45 |
| 6,782,977 B1 | * | 8/2004 | Mackiewicz | 188/73.45 |
| 6,926,124 B2 | * | 8/2005 | Matsuzaki | 188/73.45 |
| 2005/0115779 A1 | * | 6/2005 | Nakajima et al. | 188/73.31 |

* cited by examiner

*Primary Examiner*—Devon C. Kramer
(74) *Attorney, Agent, or Firm*—Lee H. McCormick, Jr.; Warren Comstock

(57) ABSTRACT

A disc brake has an anchor that is fixed to a housing to align first and second rails and friction pads for each of first and second friction members with radial surfaces on a rotor. The friction pads are moved into engagement with radial surfaces by an actuation force to develop a brake force and reaction forces that are carried into the anchor to oppose the rotation of the rotor during a brake application. The anchor has projections on the first rail located in planes that are offset from radial engagement surfaces on the rotor. The friction members each have a carrier with an outwardly projecting lip on a first end through which the brake forces are transmitted into the projections. Since the projections are offset a moment is created by the reactions forces and an axial component derived thereof added to the actuation force during a brake application.

10 Claims, 3 Drawing Sheets

Force Vectors

Physical Geometry

DISC BRAKE

This invention relates to a disc brake having carrier members associated with first and second friction pads through which reaction forces are transmitted into projections that are offset from planes corresponding to engagement surfaces on a rotor during a brake application such that a moment is created and as a result resultant axial forces derived from a moment are added to an actuation force for effecting a brake application.

BACKGROUND OF THE INVENTION

Disc brakes such as illustrated in U.S. Pat. Nos. 4,044,864; 4,219,106; 4,335,806 and 5,551,537 have an anchor with support surfaces or rails that are spaced apart from each other to receive and guide first and second friction pads toward a rotor during a brake application. In such disc brakes, the first and second friction pads each have a carrier member that is retained in first and second rails on an anchor. Reaction forces developed during a brake application are communicated from the carriers into the anchor during a brake application. While the shape of the carrier member may be different as illustrated in U.S. Pat. Nos. 5,111,914 and 6,039,155 all such carrier members are off-set with respect to a corresponding engagement surface of the rotor and as a result a moment that is a function of the thickness of a friction pad is generated through the transmission of a friction force into the anchor. This moment would be greatest when the friction pads are new and would continually decrease as the pads wear and the carrier members move closer to the rotor. This moment would produce a corresponding axial force would be added to the actuation force but would vary in intensity as a friction pad wears and as a result can not be utilized in predicting braking produced by an actuation force. In U.S. Pat. No. 6,782,977, a disc brake is disclosed wherein reaction forces created during a brake application are carried through planes that are aligned with engagement surfaces on the rotor to eliminate creation of such moments and forces associated therewith. While this disc brake would function in an adequate manner, I have determined that uniform axial forces created by moments would be useful in a disc brake having a self energizing function.

SUMARY OF THE INVENTION

It is a primary object of this invention to introduce a moment into a carrier member of a friction pad during a brake application to create a uniform axial force that is added to an actuation force to effect a brake application.

According to this invention, a disc brake has an anchor that is fixed to a housing on a vehicle with first and second rails that align first and second carrier members with first and second radial surfaces on opposite sides of a rotor. Friction pads on the first and second carrier members are respectively moved into engagement with first and second radial surfaces on the rotor to develop a reaction force that is communicated into the anchor to opposes the rotation of the rotor and thereby effect a brake application. The anchor has a first projection extends from the first rail that is located in a first plane that is offset from the first radial surface of the rotor while a second projection that is located in a second plane that is offset from the second radial surface of the rotor. Each friction pad is attached to a carrier member and defined by an outwardly projecting lip on a first end and a straight second end. During a brake application and in a forward direction of rotational of the rotor, the outward projection lips engage the first and second projection on the first rail to transmit braking forces into the anchor. The projections are offset from the radial surfaces as the braking force is transmitted into the anchor a moment is created that is added to the actuation force in effecting a brake application. Since the offset is a fixed distance from the radial surfaces, the resulting axial force is un-effected by wear of a friction pad and remains constant even through the carrier moves closer to the anchor.

An advantage of this invention resides in a carrier for friction members having an outwardly projecting lip that engages a projection that extends from an anchor in a plane and is offset with respect to a radial engagement surface on a rotor such that a moment is created in a reaction force with the axial component thereof added to the actuation force during a brake application to assist in effecting a brake application.

A further object of this invention relates to a carrier member for a friction pad wherein an outwardly projecting lip has a length that corresponds to at least an initial thickness of a friction pad with the lip engaging a projection that is offset from a radial engagement surface on a rotor such a moment is created transmitting a reaction force into an anchor and an axial component of the moment remains constant as wear reduces the thickness of the friction pad.

DETAILED DESCRIPTION

In this description a same number may be used for a feature in describing a same component when used in a different locations or it necessary may be added to the original number.

The components in disc brake 10 shown in drawings for use in a brake system of a vehicle is similar to the disc brake disclosed in U.S. Pat. No. 6,782,977 as modified through the structure and function of the present invention that utilizes an axial component of a moment derived from a reaction force to provide a uniform assist to an actuation force in effecting a brake application.

Figure 1:
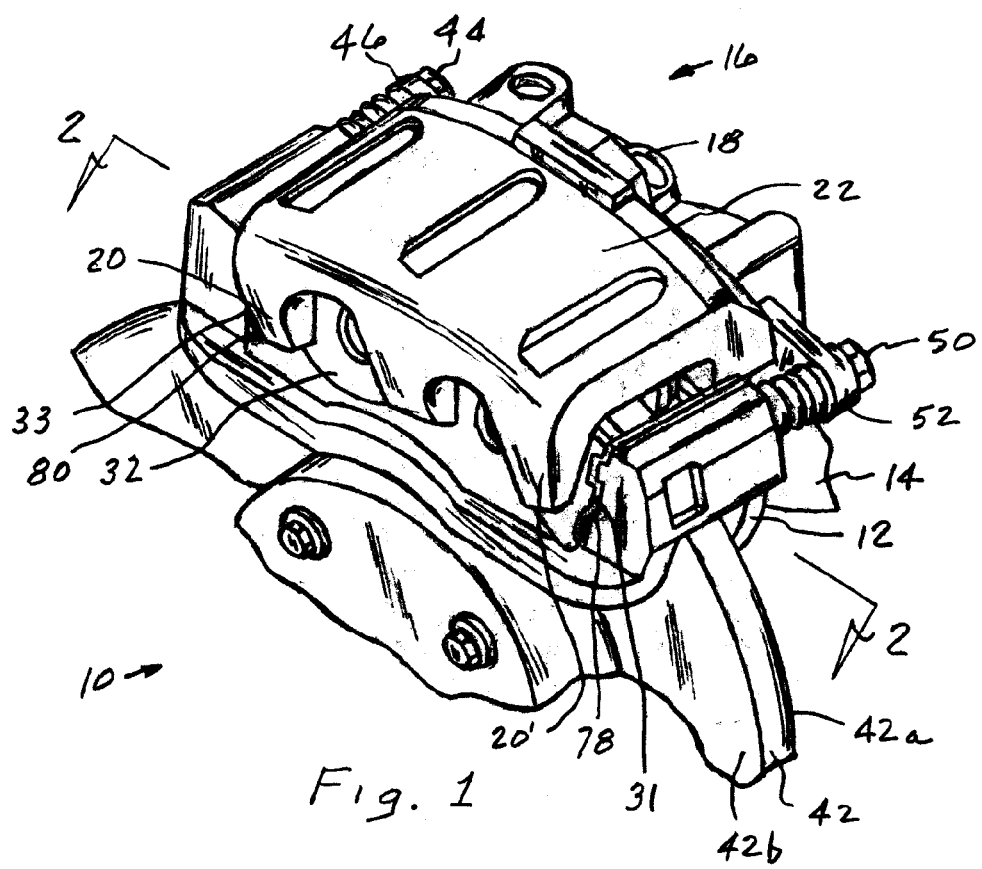
FIG. 1 is a schematic illustration of a disc brake made according to the present invention having support rails in an anchor with projections thereon that are aligned with first and second radial surface on a rotor through which reaction forces are transmitted into the anchor during a brake application.
Figure 2:
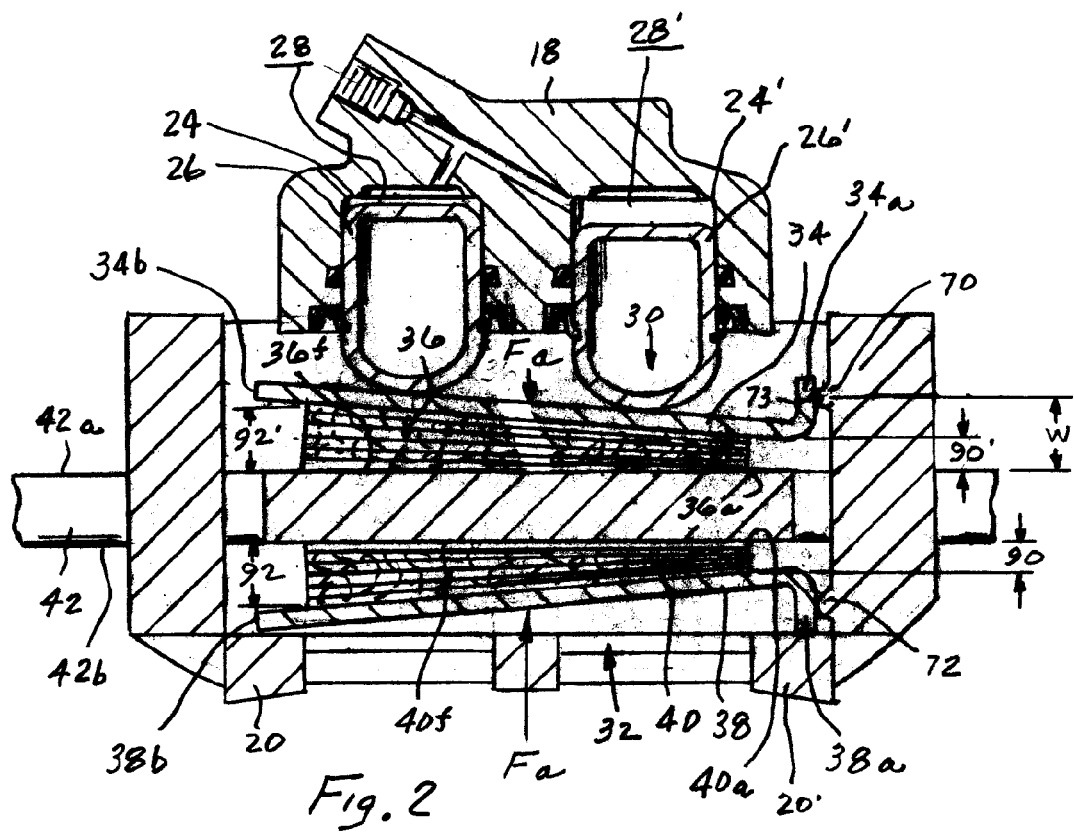
FIG. 2 is a sectional view taken along lines 2—2 of FIG. 1 showing a relationship between the first and second carriers for the first and second friction members with initial thickness, the projections on the anchor and the rotor.

The disc brake 10 as shown in FIG. 1 includes an anchor or support member 12 that is fixed to a stationary frame 14 of a vehicle and an integral caliper 16 that is connected to the support member 12 through guide pins 44 and 50. The integral caliper 16 of disc brake 10 includes an actuation section 18 that is connected by a bridge 22 to unshaped arms 20,20'. The actuation section 18 as illustrated in FIG. 2 has a bore 24, 24' therein for the retention of pistons 26, and 26' to define actuation chambers 28, 28'. A first friction member 30 is associated with pistons 26, 26' while a second friction member 32 is associated with arms 20, and 20'. The first friction member 30 includes a backing plate or carrier 34 and a friction pad 36 while the second friction member 32 also includes a backing plate or carrier 38 and friction pad 40. The backing plate or carrier 34 has a first end with outwardly extending projection 34a that is located in a slot 31 that defines a first rail of the support member or anchor 12 and a second end 34b that is located in slot 33 that defines a second rail of the support member 12. Similarly, backing plate or carrier 38 has a first end with an outwardly extending projection 38a that is located in slot 31 of the first rail and a second end 38b that is located in slot 33 of the second rail of support member or anchor 12. Slots 31 and 33 in support member or anchor 12 are parallel to each other and when the support member or anchor 12 is fixed to a vehicle, the slots 31, 33 are positioned in a perpendicular relationship with rotor 42 such that the engagement faces on the first 36 and second 40 friction pads are respectively positioned in parallel planes that are adjacent a first radial face 42a and a second radial face 42b of a rotor 42 that rotates with an axle of the vehicle. The caliper 16 is connected to the support member or anchor 12 by the first guide pin 44 that extends through an opening in an ear 46 that extends from the actuation section 18 and the second guide pin 50 that extends through an ear 52 that extends from the actuation section 18. The first 44 and second 50 guide pins are respectively mounted to slide in corresponding first and second bores in the support member or anchor 12. The first and second bores in support member or anchor 12 are spaced apart and parallel to each other to respectively align the first guide pin 44 and the second guide pin 50 in a parallel relationship with the first slot 31 in the first guide rail and second slot 33 in the second guide rails to assist in maintaining the perpendicular relationship between the radial face 42a on rotor 42 and the face on the first friction member 36 and radial face 42b on rotor 42 and the face on the second friction member 40. During a brake application, the caliper 16 slides with respect to the support member or anchor 12 and the first 44 and second 50 guide pins correspondingly move in the first and second bores in the support member or anchor 12 to maintain the parallel relationship between the friction pads 36 and 40 and corresponding radial surfaces 42a and 42b on rotor 42.

Caliper 16 moves with respect to support member or anchor 12 as a reaction to pressurized fluid being supplied to chambers 28, 28' that acts on pistons 26, 26' to move the backing plate or carrier 38 and friction member 40 toward rotor 42 as pistons 26, 26' move backing plate or carrier 34 and friction member 36 toward rotor 42. As backing plate or carrier 34 moves, the first end and outwardly extending projection 34a slides in slot 31 and the second end 34b slides in slot 33 while at the same time the first end and outwardly projection 38a on backing plate 38 slides in slot 31 and the second end 38b slides in slot 33. During a brake application, the engagement of the face of friction pad 36 with rotor face 42a and the engagement of the face of friction pad 40 with rotor face 42b create first and second reaction forces that are carried into anchor 12 by way of either the first rail or the second rail (depends on the rotational direction of the rotor) to oppose the rotation of the rotor 42. When the actuation force acting on the pistons 26, 26' and arms 20, 20' is equal to the brake forces created through the frictional engagement of the friction pads 36 and 40 with radial rotor faces 42a and 42b, the rotor 42 will come to a stop.

The communication of the reaction forces derived through the application of braking forces applied to the rotor 40 are carried into the support member or anchor 12 and according to this invention a resulting component is automatically added to the actuation force in effecting a brake application. The self energizing feature is achieve through a relationship developed between backing plate or carrier 34 and backing plate and carrier 38 and the first slot or rail 31 or the second slot or rail 33 in anchor 12. The physical structure of each backing plate or carrier and the rail of the support member 12 are identical and function in a same manner. In order to eliminate redundancy, only backing plate or carrier 34 and the first rail 31 of support member 12 will hereinafter be described in specific detail unless necessary to further define the operation of the disc brake 10.

Support member or anchor 12 has a first projection 70 and a second projection 72 that extends from the first rail 31. The first projection 70 has a width "W" with the a center 73 thereof is located along a first plane that is offset from radial face 42a on rotor 42 while the second projection 72 also has a same width "W" with a center 75 that is located in a second plane that is offset from radial face 42b on rotor 42.

The anchor 12 is made of a cast member and as a result may not possess a desired resistance to wear when engaged with another member. To protect a rubbed or engaged surface and in particular the guide surfaces of slots 31 and 33, a first surface protection member 78 (made of stainless steel) is located in slot 31 and attached to anchor 12 and a second surface protection member 80 is located in slot 33 and attached to anchor 12. The first and second surface protection members 78 and 80 each have a profile that matches the first and second rails to protect the support member or anchor (cast metal) from frictional wear.

Figure 3:
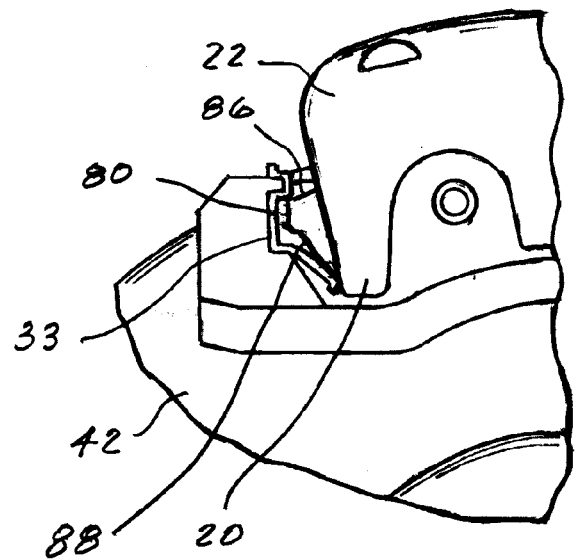
FIG. 3 is a sectional view taken along lines 3—3 showing a relationship between an end of a carrier and rail of the anchor.

The backing plate or carriers 34 and 38 are each characterized by a flat plate with a first end having an outwardly extending projection or lip 34a, 38a and a second end 34b, 38b that is extends straight from the flat plate. The outwardly extending projection or lip 34a, 38a has a length that is equal to an initial thickness of a first end 90, 90' of friction members 36 and 40. The lips 34a and 38a and straight second end 34b ad 38b are each retained in slots 31 and 33 by a top 86 and a bottom 88 as best illustrated in FIG. 3 for lip 38b to provide radial retention and maintain the friction members 36 and 40 in alignment with rotor 42.

The friction members 36 and 40 are each characterized by a first end 90, 90' and a second end 92, 92' with the first end 90, 90' having an initial first thickness and the second end 92, 92' having an initial second thickness with the first thickness being smaller than the second thickness such that a wedge shape is created as illustrated in FIG. 2. The face 36f on friction pad 36 and face 40f on friction pad 40 being aligned and correspondingly held in parallel alignment with radial face 42a and 42b on rotor 42.

In disc brake 10, during a brake application, a leading edge (36a and 40a) for the friction pads 36 and 40 is defined by the rotation of rotor 42 and is the first surface to engage the rotor 42. In the present invention the leading edges 36a and 40a are defined by the rotation of the rotor 42 in a forward direction and initially engages radial surfaces 42a and 42b to impede the rotation of the rotor 42 and effect a brake application. During a brake application, the outwardly extending lip 34a on backing plate or carrier 34 engages the first projection 70 and while the outwardly extending lip 38a on backing plate or carrier 38 engages the second projection 72 on the first rail 31 to transmit frictional engagement or reaction forces developed during a brake application into the anchor or support member 12.

The actuating pressurized fluid is supplied to chambers 28, 28' acts on pistons 26, 26' and housing 18 to develop an actuation force $F_a$ that uniformly moves the friction members 30 and 40 toward the rotor 42 and face 36f on friction member 36 and the face 40f of friction member 40 into corresponding engagement with radial surfaces 42a and 42b on rotor 42. The resulting reaction forces are carried through the point of contacts between the outwardly projecting lips 34a and 38a on the carrier members 34 and 38 and projections 70 and 72 on rail 31 along planes that are offset with the plane of frictional engagement. Since the reactions forces are offset with the frictional engagement forces, a moment is introduced and only the radial portion thereof is actually communicated into the anchor with the axial component being carried back through the carrier members 34 and 38 to be added to the actuation force during a brake application.

Figure 5:
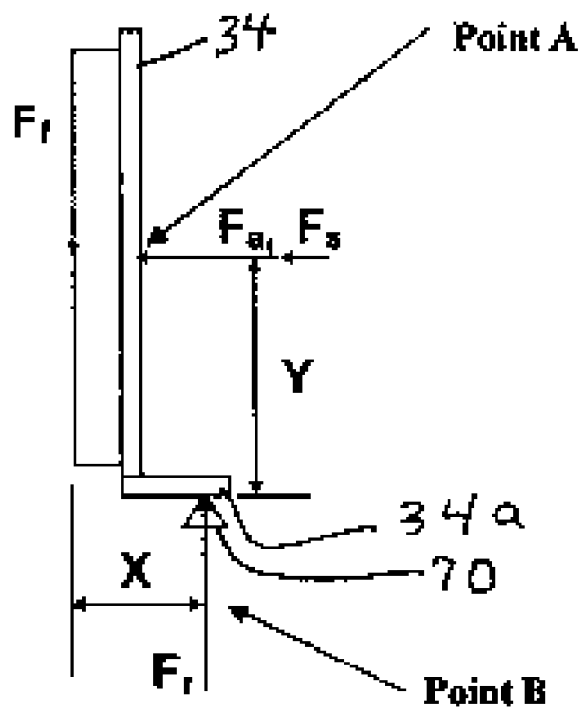
FIGS. 5, 5a and 5b are diagrams illustrating the application of force to a carrier member.
Figure 5A:
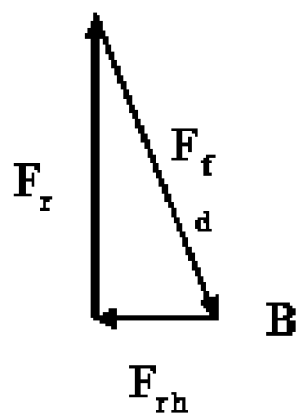
Figure 5B:
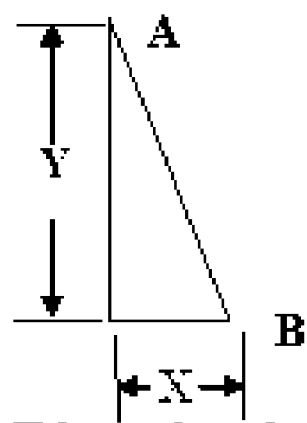

For simplification, it is assumed that all the actuation force is concentrated at the center of carrier members 34 and 38 and may be calculated according to the following formula for the force diagrams illustrated in FIGS. 5, 5a and 5b.

$$Fa = Fa1 + Fs$$

Where:
Fa=Actuation Force
Fa1=Actuation force from caliper
Fs=Servo Force
Ff=Brake Shoe Friction Generated Force
Ffd=Brake Shoe Friction Generated Diagonal Force to projection point B
Fr=Brake Shoe Reaction Force
Frh=Brake Shoe Reaction Horizontal Force
$\mu$=Coefficient of Friction between the friction members (36,40) and the rotor (42)
Frh=Fs
A=point of application of actuation force
B=distance projection is offset form rotor The Frictional Force can be expressed as a product of the Actuation Force and the coefficient of friction between the friction members (36,40) and the rotor (42), as illustrated in FIG. 5a.

$$Ff = Fa1 * \mu$$

It follows that the physical ratio of X to Y, as illustrated in FIG. 5b, is equal to the force ratio of the horizontal reaction force which is designated Frh, to Fr. Fs1, which is equal to Frh, is the single immediate horizontal component of the Ff for the initial brake actuation force Fa.

$$Fs1 = Ff * X / Y$$

By substitution for Ff:

$$Fs1 = Fa1 * \mu * X / Y$$

From a series solution standpoint, as Fs1 is created due to the offset reaction of Ff, and as Fs1 reinforces or adds to the apply force Fa, an additional Ff is created and again is reacted in an offset manner to generate additional Fs or Fs2. Following this progression to its series solution generates where the lower limit for n=1 and the upper limit is infinity:

$$Fs = Fa1 \Sigma (\mu * X / Y)n$$

The above formula may be modified to provide an initial or estimated resultant axial or servo force as following:

$$Fs = Fa1 * X * \mu / Y$$

A desired value or amount of servo force Fs would be selected for an individual application of a disc brake and is essentially dependent on the length of the offset X.

The actuation force is uniformly applied across an entire carrier member 34, 38 to bring the friction pads 36 and 40 into engagement with the rotor 42 in planes that are substantially parallel to the radial faces 42a and 42b of the rotor 42 and as a result the a braking force is developed that use an axial resultant of a moment derived from a reaction force to effect a brake application.

Figure 4:
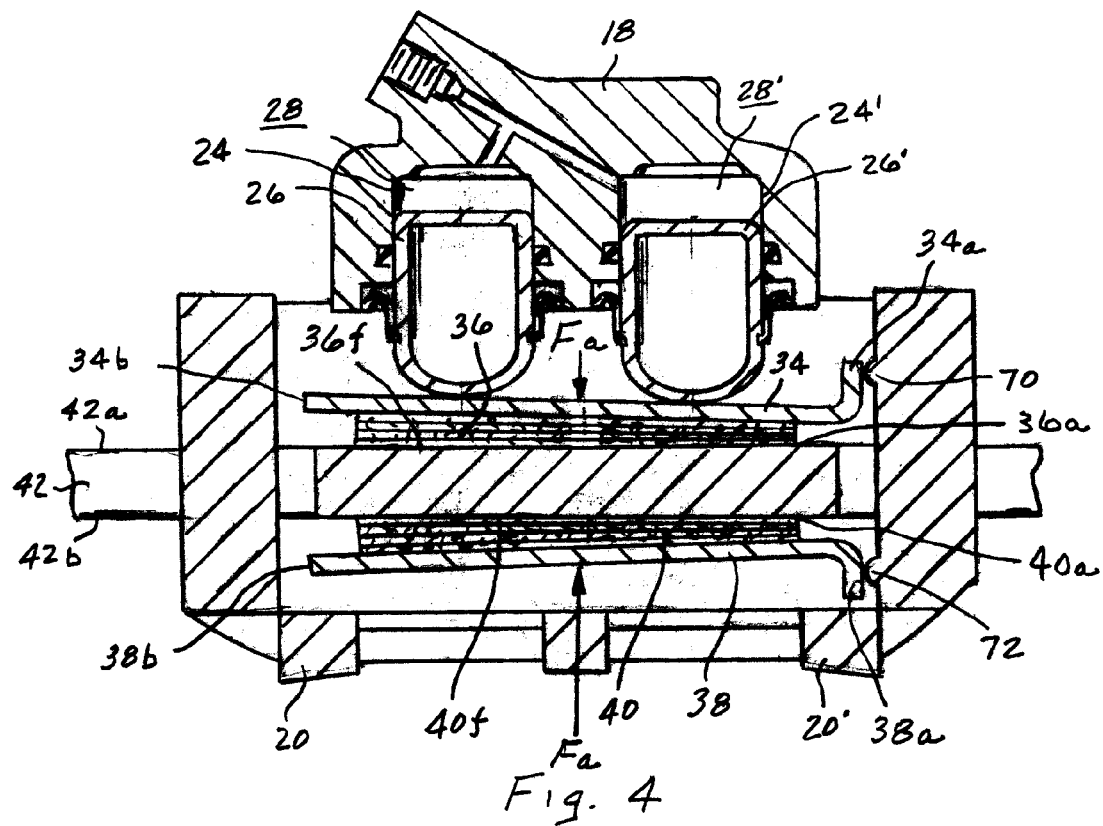
FIG. 4 is a sectional view taken along lines 2—2 of FIG. 1 of the first and second carriers and the anchor after the friction members have worn through the engagement with the rotor.

Over a period of time, the frictional engagement of friction pads 36 and 40 with radial faces 42a and 42b of rotor 42 cause the thickness of the friction members 36 and 40 to be reduced in a manner as illustrated in FIG. 4. However, the point contact relationship between the outwardly projecting lips 34a,38a and projections 70, 72 on the first rail 31 remain in planes that are offset a distance X with respect to the radial surfaces 42a and 42b of rotor and as a result the servo or axial force Fs that is added to an actuation force Fa1 remains constant even though faces 36f and 40f of friction members 36 and 40 move closer to the radial faces 42a and 42b on rotor 42 as wear reduces the thickness of the friction members 36 and 40.

What is claimed is:

1. A disc brake having an anchor fixed to a housing, said anchor having first and second rails that align first and second friction members with a rotor, said first friction member having a first friction pad that is moved into engagement with a first radial surface of a rotor and said second friction member having a second friction pad that is moved into engagement with a second radial surface on said rotor to develop first and second brake forces that are carried into said anchor as a reaction force to oppose the rotation of said rotor and effect a brake application, characterized in that said anchor has first and second projections that extend from said first rail with said first projection being located in a first plane that is offset from said first radial surface and said second projection being located in a second plane that is offset from said second radial surface on said rotor; and in that said first friction member has a first carrier with a first outwardly projecting lip on a first end and in that said second friction member has a second carrier with a second outwardly projecting lip on a first end thereof through which said first and second brake forces are transmitted into said anchor, said first and second outwardly projecting lips correspondingly engage said first and second projections on said first rail such that a substantially uniform resultant axial force is created by a moment that is a function of said offset that is added to an actuation force during a brake application.

2. The disc brake as recited in claim 1 wherein said first and second friction pads each have a thickness adjacent said first end that is smaller than a thickness adjacent a second end to compensate for said offset such that said first and second friction pads correspondingly engage said first and second radial surfaces on the rotor along corresponding first and second planes.

3. The disc brake as recited in claim 2 wherein said first end of said first and second friction pads is a leading edge that engages said rotor during a brake application.

4. The disc brake as recited in claim 3 as further characterized in that said substantially uniform resultant axial force remains substantially constant even though wear reduces the thickness of said first and second friction pads.

5. The disc brake as recited in claim 1 wherein said resultant axial force is approximately defined by the following formula:

Where:
- $\mu$ = coefficient of friction between rotor and friction members
- D = radial distance from Offset to point of application of Actuation force
- O = the offset distance, and
- Fa1 = actuation force applied by the caliper,
- Resultant axial force = $Fa1*O*\mu/D$.

6. The disc brake as recited in claim 1 wherein said resultant axial force is self energizing and defined by a series of radial component additions that are derived from said moment.

7. The disc brake as recited in claim 1 wherein said resultant axial force may be modified by moving the location of said offset with respect to said radial surfaces on said rotor and correspondingly said moment derived from said reaction force.

8. A disc brake having an anchor fixed to a housing, said anchor having first and second rails that align first and second friction members with a rotor, said first friction member having a first friction pad that is moved into engagement with a first radial surface of a rotor and said second friction member having a second friction pad that is moved into engagement with a second radial surface on said rotor to develop first and second brake forces that are carried into said anchor as a reaction force to oppose the rotation of said rotor and effect a brake application, characterized in that said anchor has first and second projections that extend from said first rail with said first projection being located in a first plane that is offset from said first radial surface and said second projection being located in a second plane that is offset from said second radial surface on said rotor; and in that said first friction member has a first carrier with a first outwardly projecting lip on a first end and in that said second friction member has a second carrier with a second outwardly projecting lip on a first end thereof through which said first and second brake forces are transmitted into said anchor, said first and second outwardly projecting lips correspondingly engaging said first and second projections on said first rail such that a substantially same resultant servo force that is a function of said offset is created by a moment and automatically added to an actuation force during each brake application for the useful life of said first and second friction members.

9. The disc brake as recited in claim 8 wherein said servo force may be approximately defined by the following formula:

Where:
- Fa1 = Actuation Force from caliper
- Fs = Servo Force
- O = Vertical distance from radial face on rotor and projection
- H = Horizontal distance from projection to center of friction member
- $\mu$ = Coefficient of Friction between the friction members and the rotor
- Fs = $Fa1*O*\mu/H$.

10. The disc brake as recited in claim 8 wherein said servo force may be approximately defined by the following formula:

Where:
- Fa1 = Actuation Force
- Fs = Servo Force
- X = Distance the offset is from the rotor
- Y = Distance to point of application of Actuation Force
- $\mu$ = Coefficient of Friction between the friction members and the rotor
- Fs = $Fa1\Sigma(\mu*X/Y)n$.

* * * * *